No. 787,910. PATENTED APR. 25, 1905.
H. C. FREDERIKSEN.
DOUBLE FRICTION GEAR FOR MOTOR CARS.
APPLICATION FILED OCT. 10, 1904.
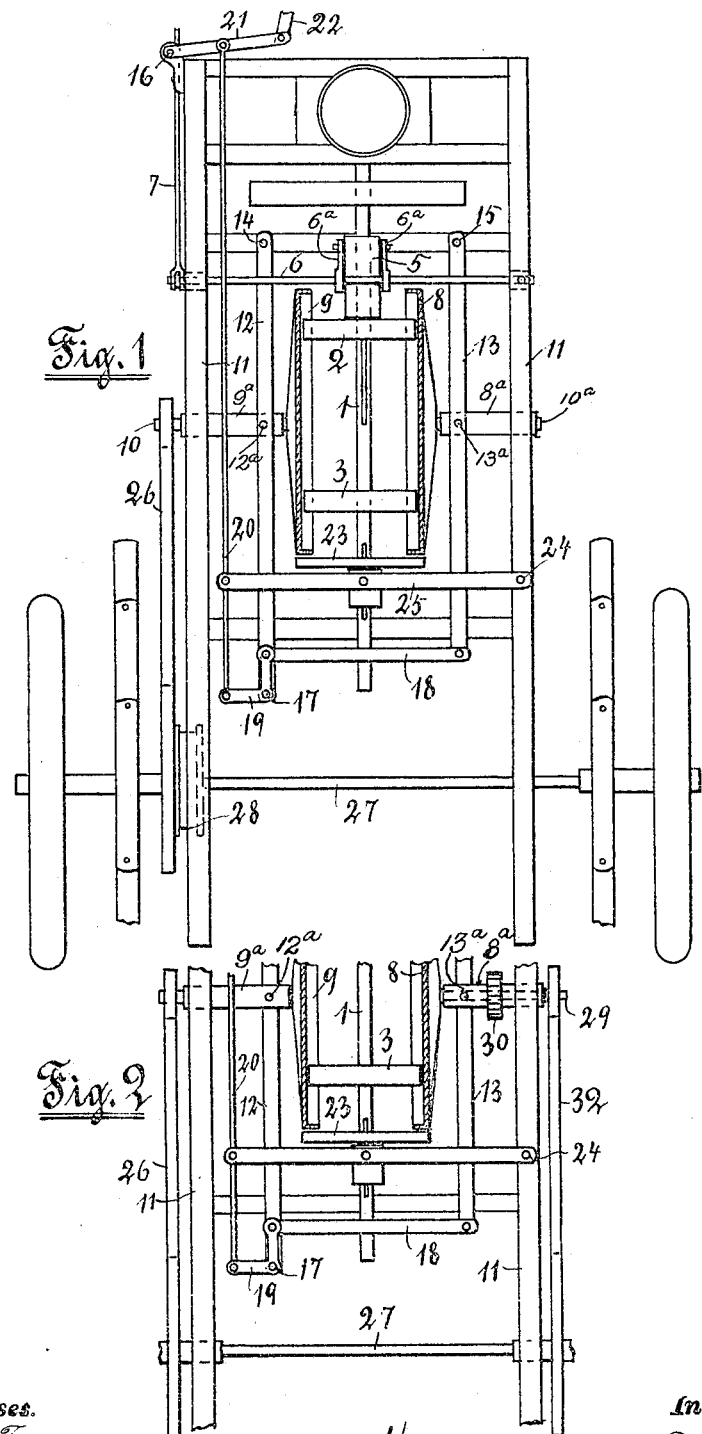
Witnesses. Inventor
Hans Christian Frederiksen
by B. Singer atty No. 787,910.

Patented April 25, 1905.

UNITED STATES PATENT OFFICE.

HANS CHRISTIAN FREDERIKSEN, OF COPENHAGEN, DENMARK.

DOUBLE FRICTION-GEAR FOR MOTOR-CARS.

SPECIFICATION forming part of Letters Patent No. 787,910, dated April 25, 1905.

Application filed October 10, 1904. Serial No. 227,847.

*To all whom it may concern:*

Be it known that I, HANS CHRISTIAN FREDERIKSEN, a citizen of Denmark, residing at Roskildevej 39, Copenhagen, Denmark, have invented a certain new and useful Improvement in Double Friction-Gears for Motor-Cars, of which the following is a specification.

My invention relates to improvements in friction-gearing for motor-driven vehicles which is adapted to perform the functions of a braking, reversing, and a speed-changing mechanism, the same being operated in the performance of its various functions by a single controlling device.

My invention will be more fully described in connection with the accompanying drawings and will be more particularly pointed out in the appended claims.

In the drawings, Figure 1 illustrates a plan view of the running-gear of a motor-driven vehicle, showing one embodiment of my improved device applied thereto. Fig. 2 is a view similar to Fig. 1, showing a modification of the connection between the running-gear and the friction-gear.

Like parts are indicated by similar characters of reference throughout both figures of the drawings.

Referring to the preferred construction, as shown in Fig. 1, there is indicated a continuously-driven shaft 1, operated by a suitable form of motor, which parts are supported on the frame of the vehicle. Said frame comprises lateral members 11, united by suitable transverse members, and is supported upon the running-gear in any suitable manner. The driving-shaft 1 is provided with a driving-wheel 2, which is non-rotatively and slidably mounted on said shaft by means of a feather-and-groove connection. An idler 3 is shown, the same being rotatively mounted upon said shaft, said driving-wheel and idler being engaged by laterally-movable friction-disks 8 and 9, arranged in parallel relation with respect to each other and the shaft 1. Said friction-disks in the operation of driving the vehicle are moved bodily toward each other, impinging on both sides of their axes, the driving-wheel, and idler 2 and 3, respectively. Said disks are provided with hubs $8^a$ and $9^a$, which are mounted upon shafts 10 and $10^a$, located at right angles to shaft 1. A sprocket-wheel on the outer end of said shaft 10 is provided in alinement with a sprocket-wheel fixed upon the rear axle 27, power being communicated from one to the other by means of a sprocket-chain 26. The disks 8 and 9 are actuated in the construction shown by operating-levers 12 and 13, pivotally mounted at 14 and 15 upon one of the transverse members of the vehicle-frame. Said levers extend rearwardly from their pivotal mountings in substantially parallel relation with the shaft 1 and are pivotally connected between their ends at $12^a$ and $13^a$ with the hubs of the disks 8 and 9. On the outer free end of lever 12 is mounted a bell-crank 19, which is pivoted at 17 to said lever. One of the arms of said crank is shown connected with a crank-bar 18, which in turn is pivotally united with the free end of lever 13. The remaining arm of said bell-crank is connected with a main actuating-rod 20, the latter extending forwardly of the vehicle and being pivotally united with a lever 21. Said lever 21 is pivoted to a stationary part of the vehicle at 16 and at its opposite end is secured to a part 22, which may be in the form of a hand or foot actuating lever. It will be obvious that a forward movement of the rod 20 will cause the levers 12 and 13 to move outwardly in opposite directions, thereby releasing the disks 8 and 9 from engagement with the driving and idler wheels 2 and 3, and, further, that a rearward movement of the rod 20 will cause an inward movement of the levers 12 and 13, effecting engagement of said disks with the driving and idler wheels. The engagement of the driving wheel and disks may be maintained in any suitable manner, means for maintaining said engagement being not herein shown. Variable speed of the vehicle is effected by longitudinal movement of the driving-wheel 2 upon the shaft toward and away from the axes of said disks. The groove in the shaft 1 desirably extends to a point intersecting the alined axes of said disks, permitting movement of the driving-wheel 2 inwardly to a point whereby the slowest speed may be attained and outwardly to a point whereby high speed is effected. The means whereby movement of the driving-wheel 2 is secured consists in the preferred construction of a rock-shaft 6, rotatively mounted in the lateral frame members 11, which shaft is connected to the hub 5 of said driving-wheel by arms 6ª. Said rock-shaft is connected at its outer end with an operating-rod 7, adapted to be actuated in any desirable manner by the driver of the vehicle.

Means are provided whereby the operator in releasing engagement between the friction-disks and driving-wheel may quickly apply braking power to said disks by a braking device, which in the preferred construction consists of a disk 23, non-rotatively mounted upon the shaft 1. Said disk 23 is non-rotatively mounted on shaft 1 by means of a feather-and-groove connection which permits slight longitudinal movement of the disk, said movement being effected by an actuating-bar 25, pivoted at one end upon the lateral frame member 11 and at its other end to the main actuating-rod 20. Said bar 25 is pivoted between its ends to the hub of the reversing-disk, whereby movement of said bar by the operating-rod 20 in opposite directions serves to effect engagement and disengagement of the disk 23 with and from the peripheries of the disks 8 and 9. It will be noted that the driving-wheel and reversing-disk, as shown, rotate in the same direction, but engage the friction-disks on opposite sides of their axes, and that said driving-wheel 2 and disk 23 cannot be simultaneously engaged with said disks 8 and 9, but are always alternately engaged therewith. Thus when the operator desires to drive the carriage in a forward direction the rod 20 is given a rearward movement and the disks 8 and 9 are brought into engagement with the driving-wheel 2, and are thus held until the operator desires to stop the vehicle, whereupon the rod 20 is given a forward movement, releasing engagement between the friction-disks and driving-wheel and effecting engagement between the reversing-disk and friction-disks. The latter members are maintained in engagement until the vehicle is stopped, when they are instantly released, the said reversing-disk acting as a braking device. Should the operator desire to drive the carriage in a rearward direction, engagement of the reversing-disk and friction-disk is maintained and braking power will be applied by throwing the friction-disk into gear with the driving-wheel.

It will be obvious that while the idler 3 is non-rotatively mounted and performs no function in the operation of driving the vehicle the same serves to equalize the strain upon the bearings of the disks 8 and 9, which strain would otherwise be unequal and tend to wrench the bearings 8ª and 9ª from their normal position of alinement.

While I have herein shown the friction-disks 8 and 9 bent inwardly at their peripheral margins to form engaging faces for the reversing-disk, it will be obvious that this is not an essential feature, inasmuch as the said reversing-disk could readily be made solid and of sufficient thickness to form a suitable engaging face for the disk 23.

The device herein shown possesses great advantages over like devices of the prior art, inasmuch as it permits the driver of the vehicle in one and the same movement to throw the driving member out of gear and apply breakage to the vehicle. It will be obvious that such an arrangement is highly desirable in case of an accident wherein it is necessary to instantly apply braking power. In constructions where the braking apparatus and driving means are controlled by separate levers and mechanism the application of braking power will obviously be much less quickly applied. A further advantage resides in the fact that braking power, which is usually applied by the reversing-disk, is in my improved construction applied far more effectively because of the fact that the disk 23 at all times engages the peripheries of the friction-disks 8 and 9, and a far greater leverage is thus secured than would be possible if braking power were applied at points nearer the center of said friction-disks. This advantage is not possible in friction-gears where the driving-wheel is reciprocated beyond the centers of the friction-disks in effecting reversal of movement, for the reason that the usual position of the idler prevents sufficient movement of the driving-wheel outwardly with respect to the friction-disks to secure engagement of the driving-wheel and friction-disk in a manner to obtain the greatest leverage. In constructions of the prior art the idler and the driving-wheel in the reversed adjustment both occupy a position at one side of the axis of rotation of said friction-disks, which adjustment effects a wrenching of the bearings of said disks, tending in time to destroy their alinement, this defective action being especially objectionable because of the fact that in the operation of a vehicle braking power is frequently applied.

It will be obvious that while I have herein shown a braking-wheel capable of performing the function of a reversing and braking device, the same being continuously driven by the shaft 1, said disk may in some embodiments of the device be otherwise mounted and adapted to act solely as a braking device.

While I have herein shown and described the preferred embodiment of my improved device, it will be obvious that changes may readily be made therefrom without departing from the spirit of the invention.

Therefore, what I claim, and desire to secure by Letters Patent, is—

1. A speed-changing and reversing friction-gear comprising a continuously-driven shaft, axially-alined friction-disks in parallel relation therewith having inturned margins forming peripheral engaging faces, said disks being laterally movable with respect to said shaft, a driving-wheel non-rotatively and slidably mounted on said shaft, means for changing the position of said driving-wheel, an idler mounted on said shaft, a braking and reversing disk non-rotatively and slidably mounted on said shaft and adapted to engage the inturned peripheries of said disks, said driving-wheel and reversing-disk engaging said friction-disks on opposite sides of the axes thereof, and a single controlling device whereby engagement may be effected alternately between said friction-disks and driving-wheel, and said reversing and friction disks.

2. A speed-changing and reversing friction-gear comprising a continuously-driven shaft, axially-alined friction-disks in parallel relation therewith having inturned margins forming peripheral engaging faces, said disks being laterally movable with respect to said shaft, a driving-wheel non-rotatively and slidably mounted on said shaft, means for changing the position of said driving-wheel, an idler mounted on said shaft, a braking and reversing disk non-rotatively and slidably mounted on said shaft and adapted to engage the inturned peripheries of said disks, said driving-wheel and reversing-disk engaging said friction-disks on opposite sides of the axes thereof, and a single controlling device whereby engagement may be effected alternately between said friction-disks and driving-wheel, said reversing and friction disks, and a single controlling-lever for said device.

3. A driving and reversing friction-gear comprising a continuously-driven shaft, axially-alined friction-disks in parallel relation therewith, said disks being movable laterally with respect to said shaft, a driving-wheel non-rotatively mounted on said shaft, an idler mounted on said shaft, a braking and reversing disk non-rotatively and slidably mounted on said shaft and adapted to engage the peripheries of said friction-disks, said driving-wheel and reversing-disk engaging said friction-disks on opposite sides of the axes thereof, and a single controlling device whereby engagement may be effected alternately between said friction-disks and driving-wheel, and said reversing and friction disks.

4. A speed-changing and reversing friction-gear comprising a continuously-driven shaft, axially-alined friction-disks laterally movable in planes parallel with said shaft, a driving-wheel non-rotatively and slidably mounted on said shaft, means for changing the position of said driving-wheel with respect to said disks, an idler secured on said shaft, a braking and reversing disk non-rotatively and slidably mounted on said shaft, said reversing-disk and driving-wheel engaging said friction-disks on opposite sides of the axes thereof, and a single controlling device whereby engagement may be effected alternately between said friction-disks and driving-wheel, and said reversing and friction disks.

5. A driving and reversing friction-gear comprising a continuously-driven shaft, axially-alined friction-disks laterally movable in planes parallel with said shaft, a driving-wheel non-rotatively mounted on said shaft, an idler for said shaft, a braking or reversing disk non-rotatively and slidably mounted on said shaft, said reversing-disk and driving-wheel engaging said friction-disks on opposite sides of the axes thereof, and a single controlling device whereby engagement may be alternately effected between said friction-disks and driving-wheel, and said reversing and friction disks.

6. A driving and braking friction-gear comprising a continuously-driven shaft, axially-alined friction-disks laterally movable in planes parallel with said shaft, a driving-wheel non-rotatively mounted on said shaft, an idler for said shaft, a braking-disk adapted to engage the peripheries of said friction-disks, and a single controlling device whereby engagement may be alternately effected between said friction-disks and driving-wheel, and said braking and friction disks.

7. A speed-changing and reversing friction-gear comprising a continuously-driven shaft, axially-alined friction-disks laterally movable in planes parallel with said shaft, a driving-wheel non-rotatively and slidably mounted on said shaft, means for changing the position of said driving-wheel with respect to said disks, an idler secured on said shaft, a braking and reversing disk non-rotatively and slidably mounted on said shaft said reversing-disk and driving-wheel engaging said friction-disks on opposite sides of the axes thereof, and a single controlling device whereby engagement may be alternately effected between said friction-disks and driving-wheel, and said reversing and friction disks, and a single controlling-lever for said device.

8. A speed-changing and reversing friction-gear comprising a continuously-driven shaft, axially-alined friction-disks laterally movable in planes parallel with said driven shaft, a driving-wheel slidably and non-rotatively mounted on said shaft, an idler mounted on said shaft, a braking and reversing disk non-rotatively and slidably mounted on said shaft and adapted to engage the peripheries of said friction-disks, friction-disk-operating levers pivotally united between their ends to said friction-disks and extending therefrom in parallel relation to said driving-shaft, said friction-disk levers being pivotally mounted to stationary parts adjacent said driving-wheel, a bell-crank lever pivotally mounted upon the free end of one of said levers, a transverse bell-crank bar connected with said bell-crank and the free end of the remaining disk-lever, a reversing-disk lever pivotally mounted at one end to a stationary part and connected between its ends with said reversing-disk, and a main actuating-rod connected with said bell-crank and the free end of said reversing-disk lever whereby movement of said rod in one direction serves to engage said friction-disks with said driving-wheel and movement in an opposite direction serves to engage said reversing-disk with said friction-disks.

In testimony whereof I affix my signature in presence of two witnesses.

HANS CHRISTIAN FREDERIKSEN.

Witnesses:
 PETER FINCK,
 HANS PEDERSEN.